United States Patent [19]
Gilmore

[11] Patent Number: 5,833,256
[45] Date of Patent: Nov. 10, 1998

[54] USER POWERED VEHICLE AND PROPULSION MECHANISM

[76] Inventor: Roger C. Gilmore, 465 Federal St., Belchertown, Mass. 01007

[21] Appl. No.: 752,022

[22] Filed: Nov. 19, 1996

Related U.S. Application Data

[60] Provisional application No. 60/007,359 Nov. 20, 1995.

[51] Int. Cl.⁶ ..................................................... B62M 1/04
[52] U.S. Cl. .......................... 280/224; 280/244; 280/233; 280/253
[58] Field of Search ..................................... 280/225, 224, 280/232, 234, 235, 242.1, 243, 244, 246, 247, 251, 252, 253, 255, 256, 282, 283, 285, 286, 288.1

[56] References Cited

U.S. PATENT DOCUMENTS

| | | |
|---|---|---|
| 519,596 | 5/1894 | Voight . |
| 869,170 | 10/1907 | Foote . |
| 1,070,158 | 8/1913 | Mercer . |
| 2,173,520 | 9/1939 | Klatt ........................................ 280/247 |
| 2,978,251 | 4/1961 | Gerdes ................................. 280/12.14 |
| 3,760,905 | 9/1973 | Dower .................................... 280/333 |
| 3,915,468 | 10/1975 | Hoareau ................................ 280/12.1 |
| 3,960,387 | 6/1976 | Nerlo .................................... 280/12.14 |
| 4,437,677 | 3/1984 | Ksayian .................................. 280/234 |
| 4,466,626 | 8/1984 | Leritz ................................... 280/12.14 |
| 4,508,358 | 4/1985 | Erel ...................................... 280/333 |
| 4,592,563 | 6/1986 | Dean et al. ............................. 280/253 |
| 4,632,414 | 12/1986 | Ellefson ................................. 280/246 |
| 4,639,007 | 1/1987 | Lawrence ............................... 280/234 |
| 4,700,962 | 10/1987 | Salmon .................................. 280/220 |
| 4,796,907 | 1/1989 | Geller . |
| 4,848,736 | 7/1989 | Anderson ............................ 272/33 R |
| 4,886,287 | 12/1989 | Krause .................................. 280/246 |
| 4,925,200 | 5/1990 | Jones .................................... 280/244 |
| 4,941,673 | 7/1990 | Bennett ................................ 280/112.2 |
| 4,943,051 | 7/1990 | Haskins .................................... 272/72 |
| 4,976,451 | 12/1990 | Kamenov ............................... 280/233 |
| 5,087,060 | 2/1992 | Rogalski ............................. 280/12.11 |
| 5,102,153 | 4/1992 | Rhode .................................. 280/7.14 |
| 5,209,506 | 5/1993 | Klopfenstein ........................... 280/240 |
| 5,272,928 | 12/1993 | Young ...................................... 74/137 |
| 5,280,936 | 1/1994 | Schmidlin .............................. 280/234 |
| 5,288,092 | 2/1994 | Miller . |
| 5,330,218 | 7/1994 | Escudero ................................. 28/245 |
| 5,354,083 | 10/1994 | Liu ........................................ 280/224 |

OTHER PUBLICATIONS

"Rowbike" (1996) Advertisement.
"Curry Lawdshiff" pp. 320–321 from Bicycling Science Book (ISBN 026223115).
"User Powered Vehicle" Dec. 4, 1994 Invention Record of Roger C. Gilmore.

*Primary Examiner*—Brian L. Johnson
*Assistant Examiner*—Gary Savitt

[57] ABSTRACT

A user powered vehicle which can be propelled upon an ice surface by applying force in repetitive power stroke movements in a rowing manner. The vehicle includes a main framework (10), a forward facing seat (64), a plurality of attached ice runners (14, 16) adapted to support the vehicle for efficient forward movement upon the operating surface, a movable propulsion wheel assembly (18) including at least one propulsion wheel (38) adapted to provide forward thrust when engaged with the operating surface, a rowing assembly (74) and footrest assembly (66) operable for converting rowing motions into propulsion force, and means (86) for transfer of weight from ice runners to propulsion wheel for increased traction during rowing power strokes and for re-transfer of weight to ice runners for improved efficiency between power strokes. The vehicle is adaptable for use on snow or land by replacing ice runners with skis or wheels respectively.

20 Claims, 4 Drawing Sheets

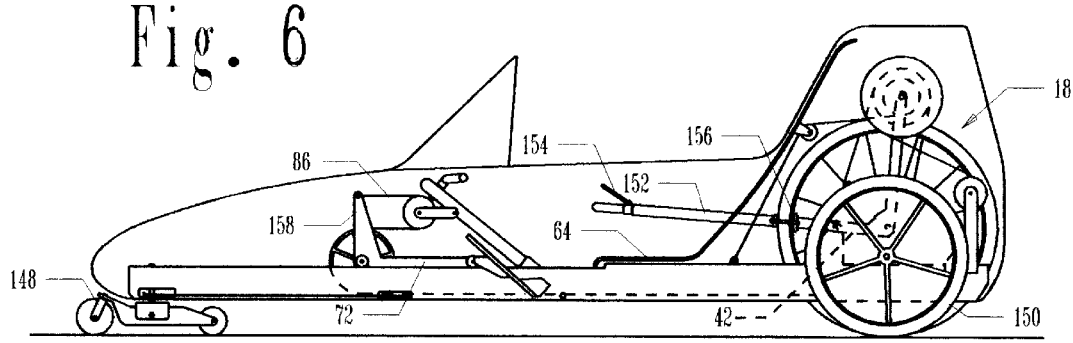
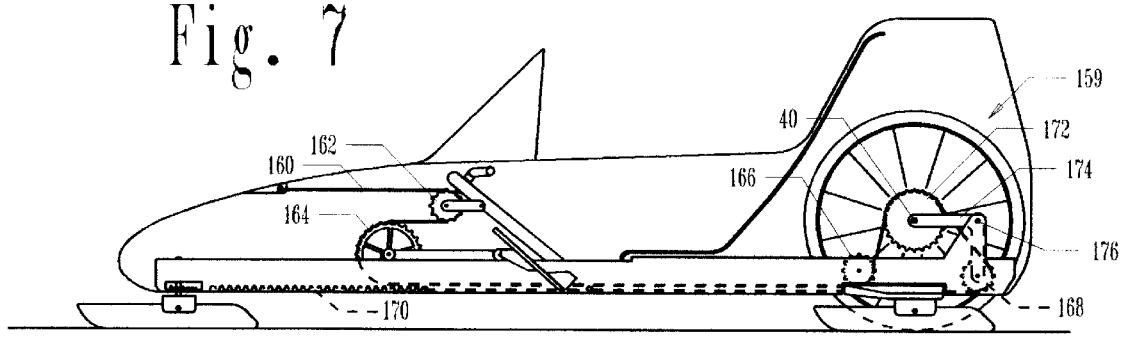
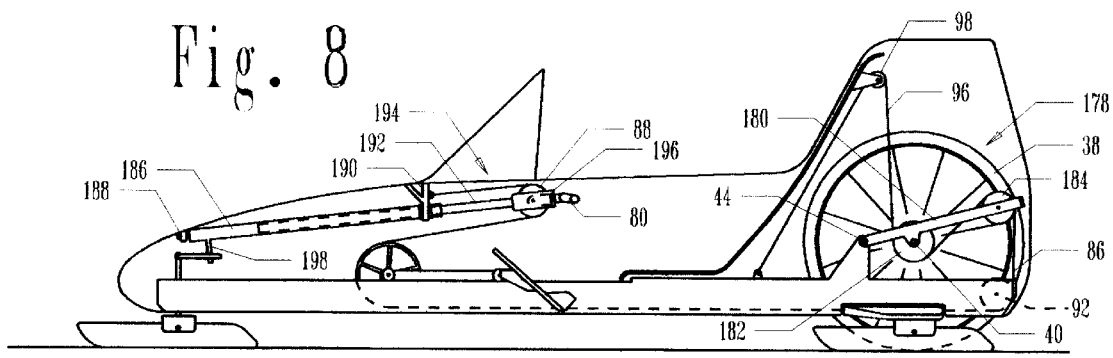

USER POWERED VEHICLE AND PROPULSION MECHANISM

BACKGROUND—CROSS REFERENCES TO RELATED APPLICATIONS

This invention is based on my provisional patent application, Ser. No. 60/007,359 filed 1995 Nov. 20.

BACKGROUND—FIELD OF THE INVENTION

The present invention relates to vehicles powered by rowing type motions of a user, and more particularly concerns user powered vehicles and propulsion mechanisms therefor which are eminently suited for use on ice and adaptable for use on snow and land.

BACKGROUND—DESCRIPTION OF PRIOR ART

User powered vehicles of many types have been developed and are in widespread use throughout the world. Such vehicles enjoy great popularity and have proven extremely useful for general recreation, sports, physical exercise and utility. The most common user powered vehicles are bicycles and three or four wheeled pedaled variations thereof intended for use on land.

Many variations of user powered vehicles attempt to use combined leg and arm power for propulsion in a manner similar to rowing. Rowing with a sliding seat has long been recognized as one of the best motions for exercising all major muscle groups and providing excellent cardiovascular fitness. This is evident by the widespread use of stationary rowing machines in homes and health clubs throughout the world. For propelling vehicles, the rowing motions are the most natural way of combining the force applied by legs, arms and back into a truly powerful human engine. The repetitive movements includes a powerful rowing stroke ("power stroke") which can use energy supplied by legs, arms and back simultaneously, a "glide" during which the vehicle coasts, and a recovery stroke ("recovery") during which the user prepares to repeat the power stroke. The power stroke is typically in use for 20–40% of the operating cycle.

U.S. Pat. Nos. 4,632,414 to Ellefson (1986), 4,639,007 to Lawrence (1987), 4,700,962 to Salmon (1987), 4,796,907 to Geller (1989), 4,886,287 to Krause (1989), 4,925,200 to Jones (1990), 4,941,673 to Bennett (1990), 5,209,506 to Klopfenstein (1993), 5,272,928 to Young (1993), 5,280,936 to Schmidlin (1994), and 5,330,218 to Escudero (1994) disclose wheeled vehicles wherein the seated user employs rowing type motions to propel the vehicle forward. Rowbike Inc. of Minneapolis Minn. is currently marketing a vehicle of this type (the "Rowbike") for outdoor exercise. Propulsion is generally achieved by applying force to upwardly directed pivoted levers (usually combined with a movable seat or foot support) and providing various means for translating this force into rotary motion of the rear wheel.

Although such wheeled vehicles provide excellent exercise, they have not found widespread acceptance due, in part, to relatively poor performance as compared to the common bicycle. This is the result of many factors including heavy and cumbersome mechanisms, poor impedance matching, instability, and excessive speed loss between the repetitive power strokes (particularly when climbing hills or operating on rough terrain). For use on ice or snow covered surfaces, such wheeled vehicles are quite unsuitable and difficult to control due to lateral slippage, poor traction, and high rolling friction.

For winter use, it is well known that ice runners or ice blades ("runners"), such as those used on sailing ice boats and skates, result in very low frictional drag on ice surfaces. Runners create drag of 0.025% to 0.2% of the weight supported thereon compared to 0.6–1.2% for rolling wheels. Furthermore, runners that are provided with sharpened edges provide much greater lateral resistance than wheels, thereby permitting a high level of maneuverability and control. It is also well known in the art, as evidenced by skiing and snowmobiling, that skis are more efficient than wheels for movement on snow covered surfaces.

For applying thrust to user powered vehicles, rotating traction or propulsion wheels in contact with the operating surface are the most common and energy efficient means known. Traction with the surface is a function the wheel design and is directly proportional to the downward force ("weight") of the propulsion wheel upon the operating surface. Studded propulsion wheels, with sufficient weight, are known to be effective for achieving traction on ice surfaces. For use on snow covered surfaces, weighted wheels with deep and wide tread patterns, such as "snow tires", are known to provide suitable traction.

For use on ice or snow covered surfaces, other variations of user powered vehicles disclose devices that are propelled by pedaling in a bicycle like manner. U.S. Pat. Nos. 3,915,468 to Hoareau (1975) and 5,102,153 to Rhode (1992) utilize rotating pedals to drive flexible belts which contact the snow covered surface. A steerable ski device is provided forward. Although the belts provide sufficient traction, the performance of such vehicles is limited due to poor conservation of kinetic energy. The traction belts further limit effective use of the skis since much of the vehicle weight remains supported by the belts.

U.S. Pat. Nos. 2,978,251 to Gerdës (1961), and 4,466,626 to Leritz (1984), disclose vehicles having runners and pedaled traction wheels which may be retracted to allow the vehicle to benefit from the runners while coasting. However, since the user must stop propelling such vehicles in order to fully benefit from the runners, performance is again compromised. Pedaled vehicles of this type also have a relatively high seating position which results in reduced stability (especially on slippery surfaces) and high air resistance which further impedes performance.

U.S. Pat. Nos. 519,596 to Voigt (1894), 869,170 to Foote (1907), and 1,070,158 to Mercer (1913) use reciprocating levers to propel a sled on snow covered surfaces by means of movable traction wheels. Voigt and Foote utilize spring depressed wheels to maintain contact with the operating surface. Mercer teaches means for retracting the wheel for use when coasting.

U.S. Pat. Nos. 5,087,060 to Rogalski (1992) discloses a seated rowing device having paired skis and oar-like thrust levers which engage the snow. The device accordingly functions as a row boat upon snow. Propulsion is restricted to relatively slow speeds on snow covered surfaces.

Although not bearing directly on user powered vehicles of this type, U.S. Pat. Nos. 3,930387 to Nerio (1976), 4,858,736 to Anderson (1989), 4,943,051 to Haskins (1990), and 5,288,092 to Miller (1994) may be referenced for additional background.

What has never before been created is a truly practical and energy efficient user powered vehicle that a) is eminently suited for use on ice, b) provides the enjoyment and superior exercising benefits of rowing, and c) is adaptable for use on ice, snow and/or land. The absence of such a vehicle results in countless lost recreational and exercise opportunities.

OBJECTS AND ADVANTAGES

It is accordingly an object of the present invention to provide a user powered vehicle which can be used on ice with greater efficiency than such vehicles known previously.

It is a further object of this invention to provide a practical user powered vehicle which can be propelled in a manner closely simulating the rowing of a shell to provide the superior full body exercising benefits and enjoyment of such motions on a year around basis.

It is another object of the present invention to provide a vehicle propulsion system operable by rowing motions which has no undesirable interaction between steering and propulsion functions.

It is yet another object of this invention to provide a vehicle propelled by rowing motions which has a low, and substantially fixed, center of gravity for superior stability and control.

It is still another object of this invention to provide a propulsion system operable by rowing motions which can use standard bicycle drive train components.

It is yet another object of this invention to provide a user powered vehicle which may be provided with an enclosure in order to improve aerodynamics and provide shelter for the user without interfering with the operation or control of the vehicle.

It is an additional object of this invention to provide a user powered vehicle which can be adapted for use on ice, snow or land surfaces.

It is another object of the present invention to provide a user powered vehicle which may be operated without special skills or athletic abilities and yet can provide excitement, enjoyment and healthy exercise in all seasons.

These and other objects and advantages of the present invention will be apparent by reference to the following descriptions taken in conjunction with the accompanying drawings.

SUMMARY

In accordance with the present invention there is provided a user powered vehicle having an improved propulsion system which is suited for use on ice, snow, or land surfaces. The vehicle is propelled by applying force in a manner similar to rowing.

In the preferred embodiment, the vehicle is for use on ice surfaces and includes an elongated chassis or framework, a low forward facing seat, a plurality of attached ice runners adapted to support the vehicle for efficient forward movement over the operating surface, a manually operable steering means interactive with at least one of the runners, a propulsion wheel adapted to provide thrust when engaged with the operating surface and, means for converting rowing motion of arms and legs into forward rotational motion of the propulsion wheel. The propulsion wheel is further provided with means for moving upwardly and downwardly in reference to the ice surface, and means for transferring vehicle weight from ice runners to the propulsion wheel for increased traction during the rowing power stroke and for re-transferring weight to the ice runners for improved efficiency between power strokes. The vehicle is adaptable for use on snow or land by replacing ice runners with skis or wheels, respectively.

Reference to the ensuing description and associated drawings will now readily enable one skilled in the art to make and use a vehicle which incorporates my invention. FIGS. 1 to 3, and the associated detailed description, set forth the best mode currently contemplated for carrying out the invention. FIGS. 4 to 8, and associated descriptions, describe alternate embodiments of the invention including an alternative weight transfer system, adaptations for use on snow and land, variations of the wheel assembly geometries, and alternative means for steering and braking the vehicle. The various features described within each embodiment are not unique to that embodiment and may be substituted and/or combined within other embodiments unless otherwise stated.

BRIEF DESCRIPTION OF THE DRAWINGS

For a fuller understanding of the nature and objects of the inventions, reference should be made to the following detailed description taken in connection with the accompanying drawing forming a part of this specification and in which similar numerals of reference indicate corresponding parts in all the figures of the drawing.

FIG. 6 is a partially schematic side view of the vehicle adapted for use on land, an alternative braking mechanism, and an alternative drive cable arrangement.

FIG. 7 is a partially schematic side view of the vehicle showing an alternate force transmitting means, a second alternative wheel assembly configuration, and an alternative recovery means.

FIG. 8 is a partially schematic side view of a vehicle of the current invention showing yet a third alternate wheel assembly configuration and an alternate rowing/steering assembly.

DETAILED DESCRIPTION OF PREFERRED EMBODIMENT—FIG. 1–3

Figure 1A:
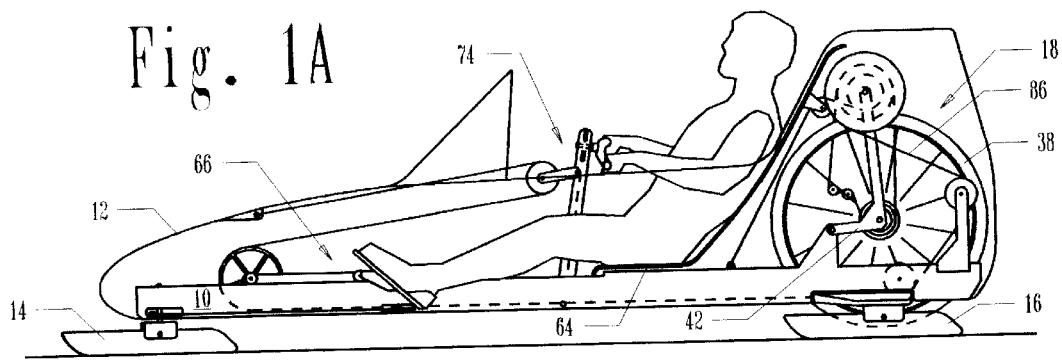
FIG. 1A to 1C are partially schematic side views of a preferred embodiment of a user powered vehicle of the present invention shown during various positions of operation.
Figure 1B:
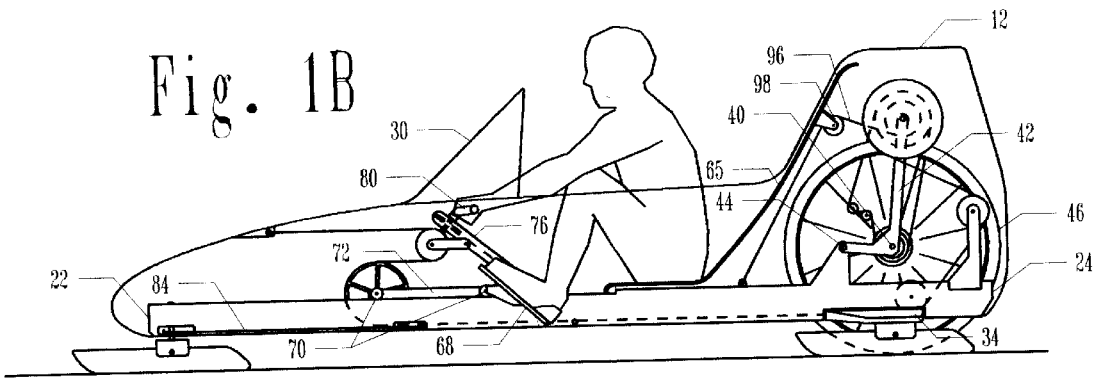
Figure 1C:
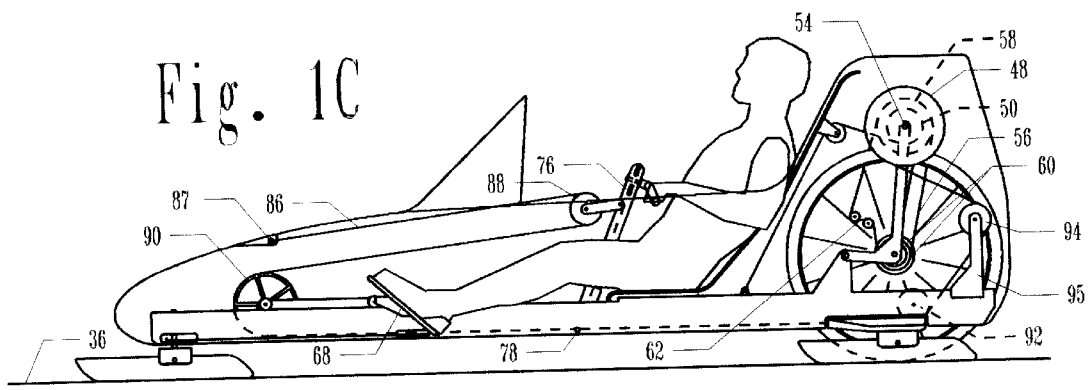
Figure 2:
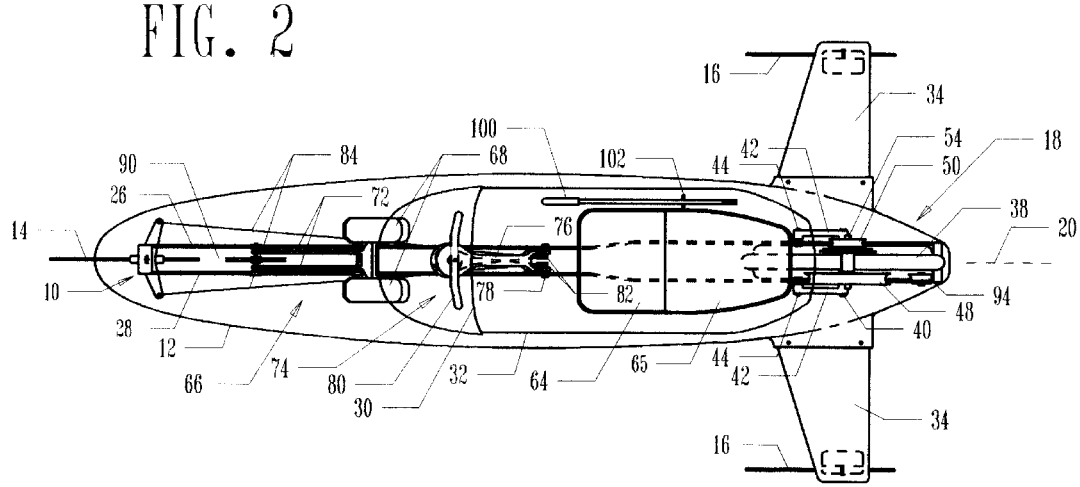
FIG. 2 is a partially schematic top plan view of the embodiment of FIG. 1 with some elements omitted for clarity.
Figure 3:
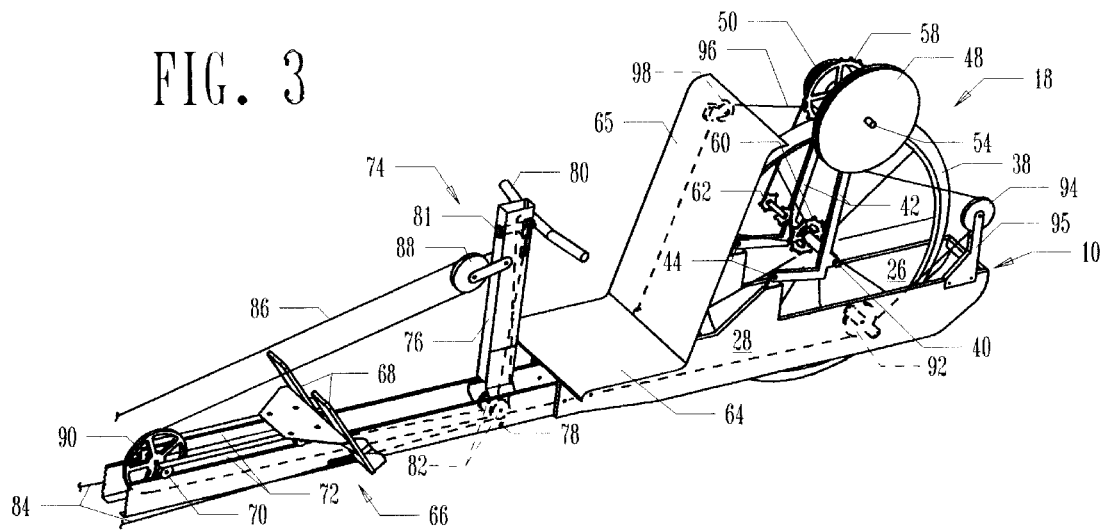
FIG. 3 is a perspective view of the propulsion and weight transfer mechanisms of the embodiment of FIG. 1.

Referring now to FIG. 1–3, a preferred embodiment of the vehicle of the present invention is shown including, a main framework 10, an attached body or enclosure 12, three ground contacting members in the form of ice runners 14 and 16 disposed below the main framework, and a propulsion wheel assembly 18 disposed rearwardly in the vehicle.

Framework 10 is elongated upon a longitudinal axis 20 between forward and rearward extremities 22 and 24, respectively. The framework may be constructed of any high strength, light weight material such as aluminum, steel tubing, sheet metal, pre-formed plastic, or combinations thereof, and preferably includes right and left framing structures 26 and 28 respectively which are symmetrically arranged about the longitudinal axis. Preferably the framing structures are spaced apart and interconnected at each extremity by any suitable means such as welded or bolted struts, or end caps. Alternatively, the framework may be a "U" shaped structure as viewed in cross section.

Vehicle enclosure 12 (shown in outline in FIG. 1–2), which is not essential to the function of the invention, may be provided to improve aerodynamics and provide shelter for the user. The enclosure is preferably constructed of strong, light weight material such as fiber-reinforced plastic or molded thermoplastic. Enclosure 12, which partially surrounds the vehicle, may be attached to framework 10 as a separate component or may be combined with the framework as a unitized structure. The enclosure may be further provided with a cockpit opening 32 to accommodate a user, and a windshield 30 disposed forwardly of the cockpit opening.

Two laterally opposed rear runners 16 are attached to framework 10 by means of a pair of lateral extensions 34. The runners and extensions are disposed to each side of axis 20 adjacent to rearward extremity 24 and preferably are removable in order to reduce vehicle width for storage and handling. Optionally, the lateral extensions may be integral with enclosure 12. Steering runner 14 is pivotally attached to the framework around a generally vertical axis adjacent to forward extremity 22 and is oriented to contact ground 36 upon center axis 20. Runners 14 and 16 are adapted to support the vehicle for efficient forward movement upon the operating surface in a conventional manner such as that used, for example, on sailing ice boats. In alternate embodiments, two laterally opposed steering runners may be used, or the ground contacting members may be skis or wheels. The term "ground" is intended herein to encompass ice, snow and land operating surfaces.

Movable propulsion wheel assembly 18 is a key element of the weight transfer system. The assembly includes a pivoting wheel frame structure 42 comprised of left and right side members (only the left is illustrated in side views) which is attached to framing structures 28 and 26 at transversely aligned pivots 44. At a position spaced rearwardly from the pivots, the wheel frame supports a traction or propulsion wheel 38 for rotation about a laterally oriented wheel axle 40. By virtue of this arrangement, the propulsion wheel is movable downwardly and upwardly in a longitudinally aligned vertical plane and is oriented to contact ground 36 upon axis 20. When the wheel is in contact with the ground, pivots 44 and wheel axle 40 are preferably at substantially the same elevation. Physical stops (not shown) may be further included to limit the range of wheel movement to a predetermined distance. The perimeter 46 of the wheel may be a rubber tire to provide traction on dry land or snow, or may be a studded structure for gripping ice surfaces. A laterally oriented drum axle 54 is rotatably attached to wheel frame 42 at a position above the wheel perimeter. Preferably, the ends of the drum axle protrude laterally beyond the propulsion wheel on both sides. First and second flanged drums 48 and 50 respectively are attached to the axle such that rotation of one drum causes like rotation of the other. One drum may be attached adjacent to each end of the axle.

An endless chain 56, and associated sprocket wheels 58 and 60, such as commonly used for bicycle drive trains, interconnects the first flanged drum to wheel 38 for the purpose of transmitting rotational power from the drum to the wheel. A one way clutch device (not shown), such as a conventional bicycle freewheel, is further provided whereby rotation of drum 48 in a counterclockwise direction (as illustrated) causes like rotation of interconnected propulsion wheel 38, and rotation of the drum in the opposite direction, or lack of drum rotation, permits counterclockwise rotation of the wheel to continue. Preferably, a multispeed gear-shifting device, such as derailleur 62, is further provided to permit proper impedance matching for the user. Alternatively, other variable speed devices may be used, such as internally geared hubs, variable diameter drums, or various hybrid systems which have been developed for use with bicycles. Such devices, and supporting operating means, are well known in the art and therefore not detailed therein. It has been found that standard bicycle drive trains and rear wheel framing may be readily adapted to be used for this invention by replacing pedal cranks with flanged drums and providing suitable frame pivots 44.

A seat 64 is attached to main framework 10 forwardly of the propulsion wheel and is adapted to accommodate a user in a forward facing position. A seat back 65 extending upwardly from the seat may be further included.

Means for converting rowing motions into forward rotational movement of the propulsion wheel includes, as a first key element, a pivoting rowing assembly 74 which is secured to the main framework forwardly of the seat. The assembly includes a drive column 76 which is pivotally attached at its lower extremity to framework 10 at transverse pivot axis 78 and has a gripping member in the form of a handle bar 80 attached near the upper end thereof and symmetrically disposed about longitudinal axis 20. For propelling the vehicle, the handle bar functions in a manner similar to oars when rowing a boat. The column is moveable in a vertical plane between a forward position, as shown in Fig. 1B and a rearward position, as shown in Fig. 1C. A rotatable idler element in the form of a first pulley 88 is attached to the column and oriented to rotate about a laterally oriented axis. Means for changing the position of pulley 88 along the axis of column 76 may be further provided (not shown). This desirable feature permits the user to adjust the relative leg vs arm force utilized to propel the vehicle.

A second key element for converting rowing motions into rotation of the propulsion wheel is movable footrest assembly 66. The assembly is associated for sliding (or rolling) movement with main framework 10 and is positioned forwardly of seat 64. The footrest assembly includes two interconnected foot support members 68 adapted to accommodate the feet of a user, forwardly extending members 72 to which the support members are secured, and a plurality of wheels 70 rotatably attached to the forwardly extending members and adapted to engage framework 10 for rolling movement thereupon. A second pulley 90 is secured to the forward portion of assembly 66 and oriented to rotate about a transverse axis (as best shown in FIG. 3). By virtue of wheels 70, the footrest assembly is movable horizontally upon the main framework between a rearward position as shown in Fig. 1B and a forward position as shown in FIG. 1C. In order to closely replicate the motions used for rowing a shell, the lowest extremity of foot support members 68 may be located 10–15cm below seat 64.

A flexible line, rope, or drive cable 86 has a first end 87 attached adjacent to the forward extremity of enclosure 12, and a second end attached to first flanged drum 48 and adapted to wind thereonto. The cable functions as means for transmitting force from footrest assembly 66 and rowing assembly 74 to wheel assembly 18. A third pulley 92 may be provided rearwardly on the main framework for the purpose of aligning the drive cable around various components. The third pulley is oriented to rotate about a generally transverse axis. A forth pulley 94 is attached to the main frame work rearwardly of wheel frame pivot 44 preferably by mounting on an upwardly extending pylon 95. The forth pulley is also oriented to rotate about a generally transverse axis, and preferably is laterally aligned with first flanged drum 48. The drive cable is routed in a "Z" shaped path about first pulley 88 on rowing assembly 74 and second pulley 90 on footrest assembly 66, and then around the third and forth pulleys and onto drum 48 to which it is secured. This is best illustrated in FIG. 1 and FIG. 3 (in order to clearly illustrate other elements, the cable has been omitted from FIG. 2).

A resiliently elongatable shock cord 96 has a first extremity attached to a main framework 10 and a second extremity windably attached to second flanged drum 50. The shock cord is adapted to wind onto the drum in a direction reverse to the winding of drive cable 86 onto drum 48. By virtue of such arrangement, the drive cable, when in a slack state during the recovery stroke of operation is caused to rewind onto drum 48. The shock cord thereby functions as a means for rewinding or returning the flexible force transmitting member to its pre-power stroke position. Optionally, rewinding of the drive cable may be effected by a spring (not shown) interactive between the flanged drum and wheel frame 42. A guide pulley 98 may be further provided and attached to seat back 65 for the purpose of defining the orientation of the shock cord emergent from drum 50. This feature permits the shock cord tension to also be used for urging the propulsion wheel away from the operation surface upon completion of the power strokes. Preferably, guide pulley 98 is provided with means for position adjustment (not shown) such that the "unweighting" force can be varied by the user.

Reference to FIG. 2–3 will now best illustrate the steering mechanism. Adjacent to the upper extremity of drive column 76, a shaft 81 is rotatably attached. Preferably, the shaft is oriented horizontally upon a longitudinal axis as viewed with the column in a upright position. Handle bar 80 is fixedly secured to the shaft. The handle bar and shaft are operably interactive with forward steering runner 14 by means of a steering cable 84. The cable is maintained about two steering pulleys 82 which are attached adjacent to the lower extremity of column 76. By virtue of this arrangement, fore and aft column movement does not affect cable tension thereby avoiding undesirable interaction between propulsion and steering functions. Steering interference is further minimize by the orientation of the handle bar pivot shaft. This orientation greatly reduces the common steering problems caused by uneven arm strengths when "rowing". In operation to steer the vehicle, the user simply turns the handle bar in a manner similar to a conventional steering wheel as shown in FIG. 1*a* (the vehicle is being turned to the left).

As schematically illustrated in FIG. 2, a brake 100, and associated brake pivot 102 are attached to enclosure 12 adjacent to the seat in a manner such that rearward movement of the upper extremity of the brake causes the lower extremity to frictionally engage the operating surface thereby slowing the vehicle.

OPERATION OF PREFERRED EMBODIMENT— FIG. 1–3

In operation of the vehicle to achieve forward movement, the start position of the power stroke is illustrated in FIG. 1B. A user (shown in outline) sits on seat 64 with both feet placed onto foot support members 68 and with knees bent. Footrest assembly 66 is therefore positioned rearwardly. While bending slightly forward at the waist, the user simultaneously grips handle bar 80 with arms fully extended. Therefore, pivoting rowing assembly 74 is located forwardly. Drive cable 86 is in a wound state upon flanged drum 48. Shock cord 96 is in an unwound state from drum 50 and therefore is not elongated nor exerting an "unweighting" force upon propulsion wheel assembly 18. Thus, wheel 38 rests upon the operating surface.

The power stroke is accomplished by the user forcefully extending legs to push the footrest assembly forward and, about one third of the way through leg extension, leaning backward from the waist while pulling the handle bar towards his, or her, body. The end position of the power stroke is illustrated in Fig. 1C. These powerful rowing motions cause the path length of cable 86 to increase and thereby forcefully remove it from drum 48 to which it is attached. This causes counterclockwise rotation (as illustrated) of the drum and forward rotation of interconnected propulsion wheel 46 which is engaged with the operating surface to effect forward propulsion of the vehicle. This action additionally causes the shock cord to be wound onto drum 50 and simultaneously elongated.

During the power stroke, a portion of the combined user and vehicle weight, which is supported by the runners, is automatically transferred to the wheel in order to increase traction with surface 36. This occurs because the force applied by drive cable 86 to pivoting propulsion wheel assembly 18 urges the assembly to rotate in a clockwise direction (as illustrated) about pivots 44. As will be apparent to those skilled in the field of mechanics, this results in a downwardly directed force on propulsion wheel 38 and an upwardly directed force on main framework 10 having attached ice runners 14 and 16. Weight is thereby transferred from the ice runners to the propulsion wheel for increased traction during each power stroke of operation. It will also be apparent to those skilled in the art, that the amount of weight transferred to the wheel is related to both the amount of force applied by the user and the perpendicular distance between the drive cable segment in contact with drum 48 and frame pivots 44. It is anticipated that a perpendicular distance adjusting mechanism (not shown), such as a device to longitudinally move pylon 95, may be provided in order to vary the downward force ("weight") of wheel 38 upon the ground during the power stroke. This very useful feature permits increasing traction when required or reducing rolling friction when traction is not required.

At the conclusion of the power stroke, cable 86 is unwound from drum 48 and shock cord 96 is elongated in a wound state upon drum 50. The user no longer applies force which causes the drive cable to urge rotation of propulsion wheel assembly 18 in a clockwise direction about pivots 44. Therefore, the wheel assembly simply "rests" on the operating surface and supports only its own weight. The remainder of the weight which the wheel supported, and exerted as a downwardly directed force upon the surface during the power stroke, is thereby At automatically transferred back to the ice runners for improved efficiency during the glide and recovery phases of operation. Additional "unweighting" of wheel 38 may be accomplished by the tensioned shock cord due to the position of guide pulley 98 which urges counterclockwise rotation (as illustrated) of propulsion wheel assembly 18. Although not required for efficient operation of the present invention, the wheel may be totally lifted from contact with the operating surface after each power stroke, thereby transferring all of the vehicle weight to the ice runners. A counterweight or spring bias means (not shown) may be further included to facilitate this action.

It should be understood that sustained propulsion of the vehicle is accomplished by repetitive power strokes of the nature described above. Between each power stroke, the user may choose to coast or glide (as illustrated in FIG. 1A), and then undergoes a recovery motion or stroke whereby the user's position reverts to that illustrated in Fig. 1B in order to repeat the power stroke.

It will now be apparent to the reader that my vehicle will permit greater propulsion efficiency and control on ice surfaces than such vehicles known to the prior art. Since minimum resistance to forward motion ("drag"), maximum traction (for thrust), and maximum lateral resistance (for control) are all desired for optimum efficiency, it is clearly beneficial to have maximum weight on the propulsion wheel when force is being applied (e.g. during power strokes) and yet to support most of the weight on the highly efficient and sharp ice runners at other times (e.g. during the 60–80% of the rowing cycle between power strokes). In accordance with my invention, this is accomplished automatically without departing from the powerful and well proven motions of conventional rowing.

DESCRIPTION OF ALTERNATE WEIGHT TRANSFER EMBODIMENT—FIG. 4

Figure 4A:
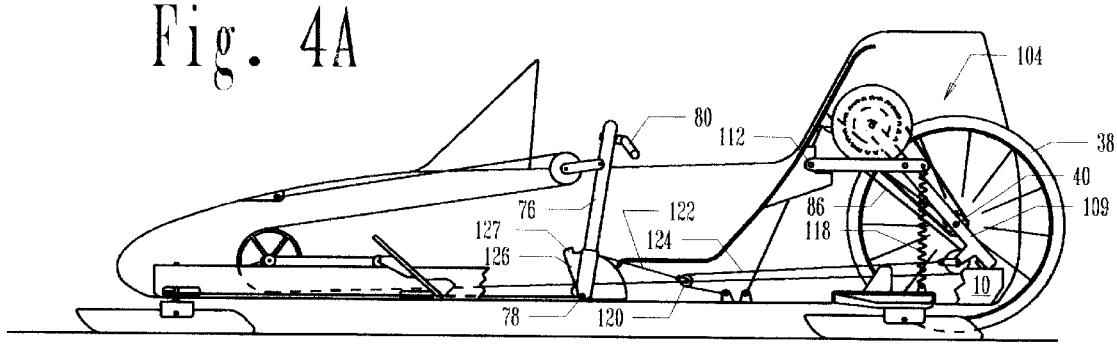
FIG. 4A–4B are partially schematic side views of a user powered vehicle of the current invention having an alternative weight transfer system shown during various positions of operation.
Figure 4B:
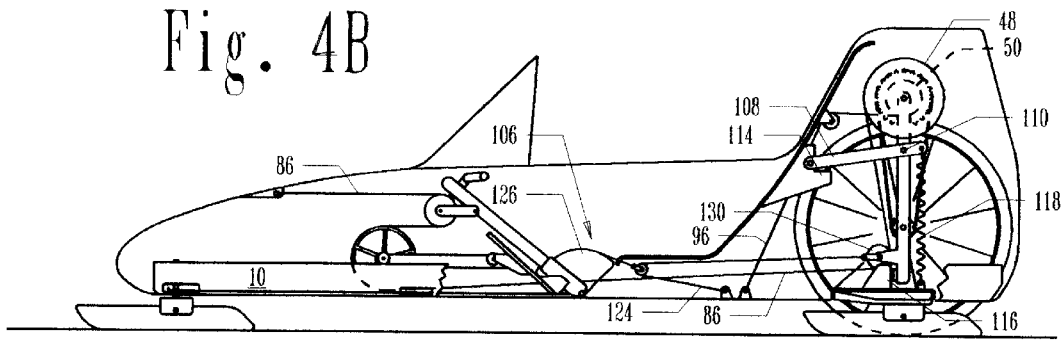

FIG. 4A–4B show an alternate weight transfer mechanism in accordance with the current invention including a swinging wheel assembly 104 and a wheel engage assembly 106. For clarity, a portion of main framework 10 is shown as cutaway. Whereas, weight transfer to the propulsion wheel for the previous embodiment was effected by user applied force to the drive cable during the power stroke, weight transfer to the propulsion wheel for this embodiment is effected by user applied force to the handle bar during the recovery phase of operation. The vehicle is substantially the same in other aspects.

Swinging wheel assembly 104 includes propulsion wheel 38, wheel axle 40, first and second flanged drums 48 and 50 respectively, shock cord 96, and power transmission means interactive between drum 48 and the wheel essentially the same as described for the previous embodiment. A pair of rearwardly extending bearing arms 108 are pivotally secured to the main framework, or to the seat, by a pair of laterally aligned pivot rods 112. The rods are located above and forward of wheel axle 40 when the wheel is engaged with the operating surface. One bearing arm is located on each side of the wheel (only the left arm is shown in side views). A swinging wheel frame structure 109 is pivotally attached to the rearward extremity of the bearing arms by a pair of transversely aligned pivot bearings 110. A first rotation limiting stop 114 is attached to the main framework, or to the seat back, in order to limit clockwise rotation (as illustrated) of the bearing arms to a generally horizontal position. The location of the stop is such that when clockwise rotation of the bearing arms is limited by the stop (as illustrated in FIG. 4A), the distance from pivot bearings 110 to the operating surface is less than the sum of the wheel radius plus the vertical distance from axle 40 to the pivot bearings. A second rotation limiting stop 116 is mounted on the main framework in order to limit clockwise rotation (as illustrated) of wheel frame 109 to a generally vertical position (as illustrated in FIG. 4B). From this description, it is now clear that wheel 38 can "swing" rearwardly to disengage with the operating surface (as shown in FIG. 4A), and when moved forwardly will engage the operating surface prior to rotation limiting as defined by stop 116 (as shown in FIG. 4B).

A pair of weight transfer springs 118 (only one is shown in side view) have an upper extremity attached to the rearward end of each bearing arm and a lower extremity attached to main framework 10 on each side of the wheel. The springs are preferably tensioned at a predetermined level to urge the bearing arms downwardly towards stops 114. Springs 118, which alternatively could be strong shock cords, or provided on only one side of the wheel, are preferably in vertically orientation when the wheel frame is engaged with stop 116. A spring tension adjusting device (not shown) may be further included to permit user adjustment for increased traction when required or reduced rolling resistance when traction is not required.

Engage assembly 106 operably connects wheel frame 109 to drive column 76 for the purpose of transferring vehicle weight to the wheel prior to the start of each power stroke. A M quadrant like member 126, having a protrusion 127 on the forwardmost portion thereof, is pivotally attached to the main framework and adapted to rotate around transverse pivot axis 78. Drive column 76 straddles member 126 and is adapted to engage the protrusion upon approximately the forwardmost half of column movement during the recovery phase of operation. A first engage line 122 has one end attached to the perimeter of the quadrant like member and a second end attached to a traveling pulley 120. A second engage line 124 has one end attached to framework 10, is routed forwardly through the traveling pulley, then rearwardly to wheel frame 109 to which the second end is attached at a position below pivot bearings 110.

OPERATION OF ALTERNATE WEIGHT TRANSFER EMBODIMENT—FIG. 4

In operation of this embodiment for transferring weight from the runners to the propulsion wheel, the user pushes handle bar 80 forwardly to extend arms prior to each power stroke. During approximately the forwardmost half of this movement, pivoting drive column 76 engages protrusion 127 on movable member 126 resulting in counterclockwise rotation (as illustrated) of the member. By action of interconnected first engage line 122, traveling pulley 120 and second engage line 124, swinging wheel frame 109 is caused to rotate clockwise into an substantially vertical alignment as defined by stop 116. Upon wheel contact with the operating surface, bearing arms 108 are forced to rotate upwardly about bearing rods 112 thereby elongating springs 118. Tension created by the elongated springs results in an upwardly directed force applied to framework 10 and a downwardly directed force applied to propulsion wheel 38. Weight is thereby transferred from the ice runners to the propulsion wheel for increased traction during the forthcoming power stroke.

At the conclusion of each power stroke, rolling resistance acts upon the propulsion wheel to cause counterclockwise rotation of frame 109 about pivot bearings 110 and, by virtue of springs 118, clockwise rotation of the bearing arms to the extent defined by stops 114. The wheel therefore swings rearwardly and just "rests" upon the operating surface. Weight is thereby automatically re-transferred to the runners for improved efficiency and control during the glide and recovery phases of operation.

DESCRIPTION AND OPERATION OF ALTERNATE WHEEL ASSEMBLY EMBODIMENTS—FIG. 5,7–8

Many arrangements and configurations of movable propulsion wheel assemblies can be utilized within the scope of this invention. By way of example, three alternate wheel assembly embodiments are disclosed in FIGS. 5, 7 and 8 and the following detailed descriptions.

Figure 5:
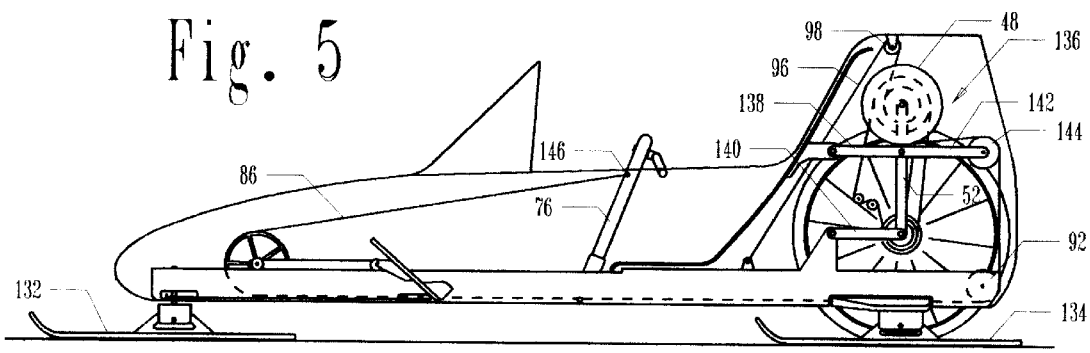
FIG. 5 is a partially schematic side view of the vehicle adapted for use on snow, an alternate configuration of the propulsion wheel assembly, and a simplified drive cable arrangement.

Referring now to FIG. 5, a first alternate wheel assembly 136 is shown including a pair of rearwardly extending upper frame members 138 positioned on each side of the wheel (only the left member is shown in side view) and a pair of parallelly aligned lower frame members 140. Each frame member has a forward end pivotally attached to the main framework, or to the seat, and a rearward end pivotally attached to a wheel frame 52 and forming a parallelogram shape in profile. An extension member 142 is rearwardly emergent from one member and preferably provided with an attached weight increase pulley 144 which is located in lateral alignment with drum 48 and rearwardly of the wheel axle. Drive cable 86 is maintained around the pulley intermediate between pulley 92 which, for this embodiment is preferably located directly below pulley 144, and drum 48.

Referring now to FIG. 7, a second alternate wheel assembly 159 is shown in combination with a force transmitting drive chain 160. A pair of rigid wheel frames 174 are pivotally attached to the main frame structure rearwardly of wheel axle 40 by laterally opposed pivot shafts 176 (only the frame on the left side of the wheel is shown in side view). The propulsion wheel is journaled from forward extending portions of the frames. A drive sprocket wheel 172 is rotatably attached to wheel axle 40 in a manner similar to a conventional bicycle freewheel. The drive chain has a first extremity attached to the main frame structure, or to the enclosure, and travels around a first, a second, and a third sprocket idler 162, 164, 166 respectively, then around the drive sprocket wheel, and finally around a forth sprocket idler 168 which is preferably mounted on a downward extension of frame 174. Sprocket idlers 162, 164 and 166 are disposed comparably to the first, second and third pulleys of the preferred embodiment as described and illustrated in FIG. 1–3. A shock cord or recovery spring 170 has one end attached to a second drive chain extremity and the other end secured forwardly to the main framework. The spring functions to effect re-positioning of the drive chain during the recovery stroke of operation.

Now referring to FIG. 8, a third alternate wheel assembly 178 is shown including a rearwardly extending wheel frame structure 180. The structure is pivotally joined to the main framework by pivots 44 located on each side of the wheel. Wheel axle 40 is attached to the wheel frame structure rearwardly of the pivots. A flanged take-up drum 182, to which drive cable 86 is windably attached, and wheel 38 are secured to rotate about the axle. A one way clutch device (not shown) is further included. A pulley or sheave 184 may be attached to structure 180 rearwardly of drum 182 in order to increase weight transfer to the wheel during power strokes. The drive cable, directly emergent from the drum, is routed around the sheave and then downwardly around pulley 92. Shock cord 96 is windably attached to drum 182 and is preferably emergent upwardly to guide pulley 98 to effect both rewinding of the cable and unweighting of the propulsion wheel between power stroke in the same manner as previously described. If desired, cable rewinding may be effected by a spring device interactive between the drum and the wheel frame in place of the shock cord. An internally geared multi-speed wheel hub, or variable diameter drum, may be further included to provide proper impedance matching for the user.

For the above three embodiments, the method of operation for transferring weight is similar to that used for the preferred embodiment as previously described and shown in FIG. 1–3. Namely, during the power stroke, the user applies force which causes the force transmitting member to urge the wheel assembly towards the operating surface. This creates a downward force on the propulsion wheel, which is in contact with the surface, and an upwardly directed force on the runners. Wheel traction is therefore increased during the power stroke and automatically reduced at the conclusion of the power stroke when the user ceases to apply force.

DESCRIPTION AND OPERATION OF EMBODIMENTS FOR SNOW AND LAND—FIG. 5–6

FIG. 5 illustrates the vehicle of the present invention adapted for use on snow including front steering ski 132 and paired rearwardly disposed skis 134 in place of the ice runners. The skis are adapted for efficient forward movement upon snow covered surfaces in a manner such as that conventionally used for snowmobiles as the like.

FIG. 6 schematically shows an adaptation of the vehicle of this invention for use on land. A front wheel assembly 148 replaces the front steering runner and two rear wheels 150 replace the rear runners (only the left wheel is shown in this side view). Attachment of the wheels to the main frame work may be accomplished by any suitable manner, as is well known in the art, and therefore is not detailed herein.

In other embodiments of this invention, two laterally spaced and steerable front wheels, or front skis, are used. Because the ground contacting members are totally independent of the propulsion mechanism, these embodiments can be operated in the same manner as previously described.

DESCRIPTION AND OPERATION OF ALTERNATE ROWING ASSEMBLY EMBODIMENT—FIG. 8

Referring now to FIG. 8, a sliding rowing assembly 194 is illustrated including a longitudinally aligned steering column 186 disposed forwardly in the vehicle. The column is preferably rectangular in cross section and is rotatably attached to forward support strut 188 and rearward support strut 190. An elongated sliding member 192 is adapted to slide within the column and is preferably of a concentric rectangular cross section such that rotation of the sliding member about its longitudinal axis causes like rotation of the column. A suitable steering linkage 198 operably connects the rotatable column to the front steering runner. Handle bar 80 and a pulley yoke 196 are fixedly attached adjacent to the rearward extremity of the sliding member. Pulley 88 is swivelably mounted within the yoke such that transverse orientation of the pulley's rotational axis is maintained as the handle bar is turned for steering the vehicle.

In operation of this embodiment for propelling the vehicle, the rowing assembly is used in substantially the same manner as that described for the preferred embodiment and illustrated in FIGS. 1–3. Specifically, during the power stroke, handle bar 80 is pulled rearwardly toward the user's body. This causes member 192 to slide within the column. By actions of the force transmitting member and associated power-train, forward rotational movement is thereby imparted to the propulsion wheel in the manner previously described.

Steering may be accomplished at any time, and without regard to rowing motions, by simply turning the handle bar in a manner similar to a conventional steering wheel. The turning movement results in rotation of the attached sliding member, and like rotation of column 186 due to the concentric and rectangular configurations. Steering linkage 198 operably connects the column to the steerable front runner in order to achieve a conventional steering response for control of the vehicle.

DESCRIPTION AND OPERATION OF ALTERNATE BRAKING EMBODIMENT—FIG. 6

Referring now to FIG. 6, an alternative braking mechanism is illustrated including a conventional bicycle-type wheel brake 156, such as a caliper brake, which is operable on the propulsion wheel. A forward extending weight transfer lever 152 is rigidly attached to pivoting wheel frame 42. On the forward extremity of the lever, which is disposed to one side of the seat, is a brake lever 154 similar to that conventionally placed on handle bars of bicycles. A cable (not shown) operably connects the brake lever to brake 156. In operation for slowing the vehicle, the user lifts upwardly on lever 152 to transfer weight to the propulsion wheel, while manually actuating lever 154 to frictionally engage the propulsion wheel by virtue of brake 156.

DESCRIPTION AND OPERATION OF ALTERNATE DRIVE CABLE EMBODIMENTS—FIG. 5–6

Referring now to FIG. 5, a simplified drive cable arrangement is illustrated wherein the forward end of cable 86 is attached directly to the drive column at an attachment site 146. The attachment site may be further provided with means for adjusting position along the column axis in order to vary the relative leg vs arm force used for propulsion.

FIG. 6 illustrates an additional drive cable embodiment wherein the forward extremity of the cable is attached to the movable footrest assembly. An upwardly extending member 158 may be mounted on members 72 for this purpose.

For propelling a vehicle incorporating these embodiments of the invention, the method of use is the same as previously described.

SUMMARY, RAMIFICATIONS, AND SCOPE

Accordingly, the reader will see that the user powered vehicle and propulsion mechanism of my invention is eminently suited for use on ice surfaces in that, 1) powerful and well proven rowing motions are used to efficiently drive a propulsion wheel, 2) weight is transferred to the propulsion wheel for effectively engaging the ice surface during the power stroke when maximum traction and thrust are desired, and 3) weight is re-transferred to highly efficient ice runners during the glide and recovery phases (typically 60–80% of the rowing cycle) when minimum drag and maximum control are desired. Furthermore, the transfers of weight are accomplished for each stroke automatically by the actions of standard rowing motions. It will also now be apparent that the vehicle in accordance with this invention has many additional advantages, for example:

It can be very stable and easy to control because the low and fixed seating position permits a very low center of gravity having little to-and-fro movement during rowing strokes.

It can be propelled using motions closely simulating those used for rowing a shell thereby providing the superior exercising benefits and enjoyment of conventional rowing on a year around basis.

Steering and propulsion functions have no appreciable interaction due to the orientation of the handle bar rotational axis and steering linkage arrangements.

It may be provided with a performance enhancing enclosure for improved aerodynamics and shelter in cold weather without interfering with its operation or control.

For economical manufacture, a wide range of standard bicycle components and after market products can be used with the propulsion mechanism including multi-speed drivetrain systems, spiked tires, and caliper brakes.

It can be adapted for use on land or snow covered surfaces by simply substituting wheels or skis respectively for the ice runners.

It can be used to provide exciting recreation and wholesome exercise without special skills or athletic abilities. Even physically challenged individuals can operate my vehicle by using only their arms.

Although the description above contains many specificities, these should not be construed as limiting the scope of the invention but as merely providing illustrations of some of the presently preferred embodiments of this invention. It is apparent to those skilled in the art that changes, modifications and substitutions may be made therein without departing from the invention in its broadest aspects. A partial list of alternate or modified arrangements, in addition to those previously described, follows:

Means for attaching the movable propulsion wheel assembly to the main framework may comprise a flexible coupling device, or the assembly may be associated with a vertically inclined slot or track apparatus which is adapted to provide for movement of the assembly upwardly and downwardly.

The pivoting rowing assembly, of the operating principle represented by FIG. 1 to 7 and associated descriptions, may include, in lieu of column 76, a pivoting inverted "U" shaped assembly which extends over the user's legs, or a longitudinally aligned pivoting parallelogram structure whereby handle bar shaft 81 is maintained in substantially horizontal position throughout the rowing motions.

The movable propulsion wheel assembly may be of a wide range of geometries and configurations, including: disposing assembly pivot (44 in the preferred embodiment, or 112 in the embodiment of FIG. 4) either forwardly or rearwardly of wheel axle 40; disposing the force receiving member (drum 48, or sprocket wheel 172) either forwardly or rearwardly of the propulsion wheel axle, mounting the force receiving member for rotation about wheel frame pivot axis 44 (or 110) or about propulsion wheel axle 40; and, either providing or omitting a pulley 184 (or a sprocket wheel, if the force transmitting member is chain) attached to the movable wheel assembly for engagement of the force transmitting member directly emergent from the force receiving member.

Means for transferring weight may include a swinging wheel assembly, of the principle illustrated in FIG. 4, but without spring depressed bearing arms 108. Instead, swinging wheel frame 109 may be pivoted about bearings 110 directly from elevated pylons (not shown), or from enclosure 12. In accordance with this embodiment, the rearward portion of the vehicle is lifted from the operating surface upon wheel engagement with the ground during the recovery stroke of operation thereby transferring weight to the propulsion wheel.

Means for rewinding the drive cable may include a stepped drum wherein the cable is wound onto one step and the shock cord is reverse wound onto another step. The flexible force transmitting member may be a belt having one end windably attached to a force receiving drum or, it may be a cleated belt for engaging a "notched" force receiving dum and having tensioning means attached to the other end in order to effect re-positioning after each power stroke.

Thus, the scope of the invention should be determined by the appended claims and their legal equivalents, rather than by the examples given.

I claim:

1. In a user powered vehicle that is propelled upon an operating surface by applying force in repetitive power stroke movements of arms and legs in a rowing manner, including a framework, a seat, and at least three ground contacting members adapted to support said vehicle for forward movement upon said operating, surface, the improvement comprising,
   (a) a propulsion wheel assembly including at least one propulsion wheel, a wheel axle, and a frame structure for supporting said wheel axle
   (b) means for attaching said propulsion wheel assembly to said framework to provide for movement of said propulsion wheel upwardly and downwardly in reference to said operating surface,
   (c) a rowing assembly secured to said framework and including a gripping member adapted for repetitive movements rearwardly in response to said repetitive power stroke movements of arms,
   (d) a footrest assembly slidably disposed upon said framework and adapted for repetitive movements forwardly in response to said repetitive power stroke movements of legs,
   (e) means, including at least one flexible force transmitting member, for drivingly connecting said gripping member and said footrest assembly to said propulsion wheel whereby movement of said flexible force transmitting member from a start position to a finish position in response to said power stroke movements imparts forward rotational movement to said propulsion wheel,
   (f) rewinding means operably connected to said flexible force transmitting member for moving said flexible force transmitting member from said finish position to said start position between said repetitive power stroke movements, and
   (g) weight transferring means interactive between said framework and said propulsion wheel assembly for repetitively transferring a portion of the weight supported by said ground contacting members to said propulsion wheel in concert with said repetitive power stroke movements whereby said propulsion wheel supports an increased amount of weight during said repetitive power stroke movements and a reduced amount of weight between said repetitive power stroke movements and whereby said propulsion wheel may be lifted from said operating surface after each of said power stroke movements.

2. The vehicle of claim 1 wherein said footrest assembly further includes at least one first rotatable idler element and said flexible force transmitting member is arranged to engage said first rotatable idler element presenting a generally "C" shaped path at a position intermediate said gripping member and said propulsion wheel.

3. The vehicle of claim 2 wherein said flexible force transmitting member has a first end affixed forwardly of said gripping member, said gripping member has at least one second rotatable idler element operably attached thereto, and said flexible force transmitting member is arranged to engage said second rotatable idler element presenting a generally "C" shaped path at a position intermediate said first end and said first rotatable idler element.

4. The vehicle of claim 1 wherein said gripping member is further provided with means for pivoting about an axis that is generally parallel to the direction of said power stroke movements of arms, and steering means operably connecting said gripping member to at least one of said ground contacting members.

5. The vehicle of claim 1 wherein said rewinding means comprises a resiliently elongatable member operably interconnecting said propulsion wheel assembly and said framework and arranged to urge said propulsion wheel away from said operating surface when said resiliently elongatable member is under tension.

6. The vehicle of claim 1 wherein said weight transferring means comprises means for aligning said flexible force transmitting member emergent from said propulsion wheel assembly whereby a tensioning force applied to said flexible force transmitting member in response to said power stroke movements urges said propulsion wheel downwardly in reference to said operating surface.

7. A vehicle that can be propelled by a user upon an operating surface by applying force in repetitive power stroke movements of arms and legs in a rowing manner, including a framework, a seat, at least three ground contacting members adapted to support said vehicle for forward movement upon said operating surface, and the improvement comprising:
   (a) a propulsion wheel assembly including at least one propulsion wheel, a wheel axle, and a frame structure for supporting said wheel axle,
   (b) means for attaching said propulsion wheel assembly to said framework to provide for movement of said propulsion wheel upwardly and downwardly in reference to said operating surface,
   (c) rowing means associated with said framework operable for converting said repetitive power stroke movements into forward rotational movement of said propulsion wheel, wherein said rowing means includes,
      (i) a rowing assembly secured to said framework and including a gripping member adapted for repetitive movements rearwardly in response to said repetitive power stroke movements of arms,
      (ii) a footrest assembly slidably disposed upon said framework forwardly of said seat and adapted for repetitive movements forwardly in response to said repetitive power stroke movements of legs, wherein said footrest assembly includes at least one first rotatable idler element,
      (iii) a flexible force transmitting member operably connecting said gripping member and said footrest assembly to said propulsion wheel assembly and arranged to engage said first rotatable idler element presenting a generally "C" shaped path at a position intermediate said gripping member and said propulsion wheel assembly whereby said flexible force transmitting member moves from a start position to a finish position in response to said power stroke movements and imparts said forward rotational movement to said propulsion wheel thereby, and
      (iv) rewinding means operably connected to said flexible force transmitting member for moving said flexible force transmitting member from said finish position to said start position between said repetitive power stroke movements; and
   (d) weight transferring means interactive between said framework and said propulsion wheel assembly for repetitively transferring a portion of the weight supported by said ground contacting members to said propulsion wheel in concert with said repetitive power stroke movements whereby said propulsion wheel is repetitively urged downwardly in reference to said operating surface in response to force applied by said user such that increased traction of said propulsion wheel with said operating surface is realized during said repetitive power stroke movements.

8. The vehicle of claim 7 wherein said flexible force transmitting member is a line and said first rotatable idler element is a pulley.

9. The vehicle of claim 7 wherein said gripping member includes at least one second rotatable idler element operably attached thereto, said flexible force transmitting member has a first end affixed forwardly of said gripping member, and said flexible force transmitting member is arranged to engage said second rotatable idler element presenting a generally "C" shaped path at a position intermediate said first end and said first rotatable idler element.

10. The vehicle of claim 7 wherein said weight transferring means comprises means for aligning said flexible force transmitting member emergent from said propulsion wheel assembly such that a tensioning force applied to said flexible force transmitting member in response to said power stroke movements urges said propulsion wheel downwardly in reference to said operating surface.

11. The vehicle of claim 7 wherein said gripping member is further provided with means for pivoting about an axis that is generally parallel to the direction of said power stroke movements of arms, and steering means operably connecting said gripping member to at least one of said ground contacting members.

12. The vehicle of claim 7 wherein said rowing assembly further includes a column elongated upon an axis and having a lower end pivotally attached to said framework adjacent thereto, an upper end having said gripping member pivotally attached adjacent thereto, and steering means operably connecting said gripping member to at least one of said ground contacting members, wherein said column is adapted for movement encompassing a longitudinally aligned vertical plane and said gripping member is arranged for pivotal movement encompassing a laterally aligned plane substantially parallel to said axis of said column.

13. The vehicle of claim 7 wherein said rewinding means comprises a resiliently elongatable member arranged to urge said propulsion wheel upwardly in reference to said operating surface when said resiliently elongatable member is under tension.

14. A user powered vehicle that can be propelled upon an operating surface by applying force from arms and legs in concert in repetitive power stroke movements in a rowing manner, comprising;

(a) a framework elongated upon a center axis between front and rear extremities, (b) a seat attached to said framework, (c) at least three ground contacting members selected from the group consisting of runners, skis, and wheels, disposed below said framework adjacent said front and rear extremities and adapted to support said vehicle for forward movement upon said operating surface, wherein two of said ground contacting members are associated with said rear extremity and spaced laterally to each side of said center axis and at least one of said ground contacting members is associated with said front extremity in a pivoting manner to produce a steering effect, (d) a propulsion wheel assembly disposed rearwardly on said framework comprising at least one propulsion wheel adapted to provide forward thrust to said vehicle upon forward rotational movement thereof when engaged with said operating surface, a wheel frame structure, a wheel axle supported by said wheel frame structure, a flanged drum journaled from said wheel frame structure, and power transmission means drivingly connecting said flanged drum to said propulsion wheel and including a one way clutch device whereby rotation of said flanged drum in a first direction imparts said forward rotational movement to said propulsion wheel and rotation of said flanged drum in a second direction permits said forward rotational movement of said propulsion wheel to continue, (e) means for attaching said propulsion wheel assembly to said framework to provide for movement of said propulsion wheel upwardly and downwardly in reference to said operating surface, (f) a rowing assembly secured to said framework forwardly of said seat and including a gripping member adapted to provide for repetitive movements rearwardly in response to said repetitive power stroke movements of arms, (g) a footrest assembly slidably disposed upon said framework forwardly of said seat and adapted for repetitive movements forwardly in response to said repetitive power stroke movements of legs, wherein said footrest assembly includes a first pulley, (h) a line having a first end thereof windably attached to said flanged drum and arranged to engage said first pulley presenting a generally "C" shaped path, and means for operably connecting said line to said gripping member, whereby said line moves from a start position to a finish position in response to said power stroke movements of arms and legs, (i) rewinding means operably connected to said line for moving said line from said finish position to said start position between said power stroke movements, and (j) weight transferring means interactive between said framework and said propulsion wheel assembly and operable for transferring a portion of the weight supported by said ground contacting member to said propulsion wheel whereby increased traction of said propulsion wheel with said operating surface is realized during said power stroke movements.

15. The vehicle of claim 14 wherein said line has a second end affixed forwardly of said gripping member, and said means for connecting said line to said gripping member includes a second pulley wherein said line is arranged to engage said second pulley presenting a generally "C" shaped path at a position intermediate said second end and said first pulley.

16. The vehicle of claim 14 wherein said rowing assembly further includes a column elongated upon an axis and having a lower end pivotally attached to said framework adjacent thereto and an upper end having said gripping member pivotally attached adjacent thereto, wherein said column is adapted for movement encompassing a longitudinally aligned vertical plane and said gripping member is arranged for pivotal movement encompassing a laterally aligned plane substantially parallel to said axis of said column.

17. The vehicle of claim 16 further including steering means operably connecting said gripping member to at least one of said ground contacting members.

18. The vehicle of claim 14 wherein said wheel frame structure has a transversely aligned pivot axis thereon at a position spaced from said wheel axle when said propulsion wheel is engaged with said operating surface, and said means for attaching said propulsion wheel assembly to said framework comprises pivot means at said pivot axis.

19. The vehicle of claim 14 wherein said weight transferring means comprises means for routing said line emergent from said propulsion wheel assembly whereby a tensioning force applied to said line in response to said power stroke movements urges said propulsion wheel downwardly in reference to said operating surface.

20. The vehicle of claim 14 wherein said rewinding means comprises a resiliently elongatable member arranged to urge said propulsion wheel away from said operating surface when said resiliently elongatable member is under tension.

* * * * *